United States Patent [19]
Rush et al.

[11] Patent Number: 5,775,348
[45] Date of Patent: Jul. 7, 1998

[54] APPLE CLEANING SYSTEM USING HIGH PRESSURE WASHING

[75] Inventors: Heath Rush, Wenatchee; Jeffrey Kent Townley, Cashmere, both of Wash.

[73] Assignee: Rush Consultants, Inc., Wenatchee, Wash.

[21] Appl. No.: 688,867

[22] Filed: Jul. 31, 1996

[51] Int. Cl.⁶ ............................................. B08B 3/02
[52] U.S. Cl. ............................ 134/72; 134/107; 134/108; 134/111; 134/131
[58] Field of Search ..................... 134/25.3, 68, 72, 134/73, 74, 99.2, 107, 108, 111, 131, 151; 15/3.14, 3.15; 99/534, 536

[56] References Cited

U.S. PATENT DOCUMENTS

| | | | |
|---|---|---|---|
| 1,311,496 | 7/1919 | Castellini | 134/131 X |
| 1,671,923 | 5/1928 | Brogden | 134/24.3 X |
| 1,674,064 | 6/1928 | Ridley | 134/72 |
| 1,707,610 | 4/1929 | Guignard et al. | 134/72 |
| 1,932,827 | 10/1933 | Morris et al. | 134/72 |
| 2,050,964 | 8/1936 | Dean et al. | 134/74 |
| 2,249,792 | 7/1941 | Skinner | 134/25.3 X |
| 2,840,090 | 6/1958 | Bradford | 15/3.14 X |
| 3,105,504 | 10/1963 | Hirahara | 134/72 X |

*Primary Examiner*—Philip R. Coe
*Attorney, Agent, or Firm*—Jensen & Puntigam, P.S.

[57] ABSTRACT

A cleaning system for use in an apple pre-sizing or packing line including a plurality of high pressure spray nozzles located a short distance above the apples on the line. The spray is maintained at a pressure in the range of 70–300 psi and is directed so as to substantially contact all of the surfaces of the tumbling apples as they move along the packing line. The spray fluid is collected beneath the packing line, and recirculated back to the spray nozzles by a pump, at a volume rate of 50–600 gpm. In modifications of the apparatus, the spray fluid may be heated to a temperature between ambient and just below that which is known to damage apples. In addition, chemicals may be added to the fluid, and/or the fluid may be heated and the fluid sent through a length of contact piping prior to being recirculated to the nozzles, with the piping being of sufficient size and length such that mold spores are killed by the chemicals/heat of the fluid during residence in the contact piping.

13 Claims, 4 Drawing Sheets

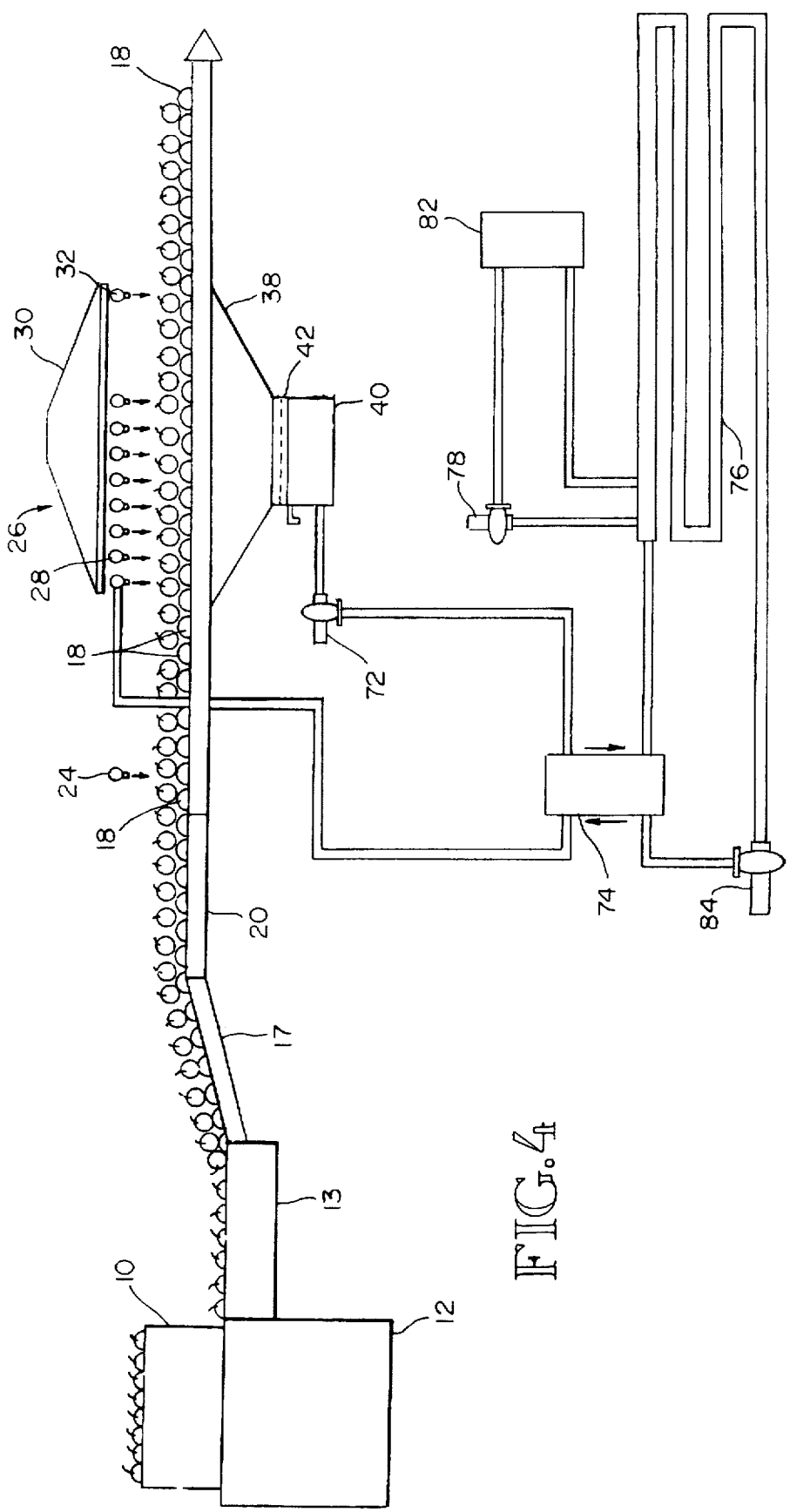

APPLE CLEANING SYSTEM USING HIGH PRESSURE WASHING

TECHNICAL FIELD

This invention relates generally to a system for cleaning apples and more specifically concerns such a system which includes spray washing the apples.

BACKGROUND OF THE INVENTION

In the apple industry, it is standard practice to clean, sort and pack the harvested fruit prior to its entering commercial channels. Apples are transported in carefully packed boxes to distribution centers and then to retail outlets. In a typical cleaning and packing system, apples are initially delivered to a water-containing "dumper" from large field bins. In the dumper, the apples float and are picked up by a traveling bar arrangement which extends into the dumper. The apples are then moved through a packing line, which typically may vary from three to seven feet in width, by a series of cylindrical bars, brushes and/or sponges mounted for rotation. The apples are initially hand-sorted to eliminate those apples having rot and other substantial imperfections. A cleaning chemical such as soap is then applied to the fruit as it continues to move along the line. The soap is rinsed off with water and the fruit is then dried, waxed, dried again and then packed for storage and shipment. Prior to the packing, the apples are typically sorted again for size and color.

In the cleaning process, soap is mixed with water and then sprayed over the fruit using very low pressure, through low volume nozzles, which are mounted on pipes positioned directly above the fruit as it moves along the line. The rinse spray is usually fresh water, again at very low pressure, typically 10-30 psi and low volume, i.e. 5-15 gallons per minute. If the fruit is to be waxed, the rinse may be hot water, which is then sometimes recycled. The recycled rinse water may be treated with chlorine or other material to prevent the spread of decay organisms.

While the above process has been fairly successful in removing dirt from the main surface of the apples, dust, insects, residue and mineral deposits remain in certain areas, especially the stem bowl and the calyx end, which cannot be reached by the conventional cleaning process. This results in unsightly and in some cases unsanitary deposits on what should be "clean" apples.

More thorough cleaning systems, using high pressure washing, are used in the citrus industry but these operate at extremely high pressures (300-600 psi), at low volumes. While such high pressure washing systems produce good cleaning, the apple industry has been uniformly resistant to such techniques, because of a historical and widespread concern over possible damage to the fruit during such a washing process. Hence, the primary cleaning of apples occurs in the dumper and by the application of soap and then rinsing under very low pressures and volumes. Again, as indicated above, such cleaning procedures are not completely effective.

In addition, fruit that has rotten portions may in some cases be passed down the line, where it may be partially torn apart by the action of the brushes. It is possible that decayed fruit portions may be deposited on the skin of good fruit. This results in an unsightly product, an inferior wax coating and the spreading of mold. Further disadvantages with existing systems include the build-up of decay spores in the recycled rinses and the rise in fruit core temperatures due to the use of heat in the dumper to improve the waxing of the fruit.

All of the above factors are difficulties in the preparation of apples for packing and shipment, and have a negative effect on the quality, marketability and sale price of the apples.

DISCLOSURE OF THE INVENTION

Accordingly, the present invention is a system for cleaning apples prior to packing thereof, in a pre-sizing or packing line which includes a receiving portion where apples are moved onto the packing line and a packing station, the system comprising: means for spray washing the apples with a washing fluid, at a pressure in the range of 70-300 psi; means for collecting the washing fluid after it has been used to wash the apples; and means for recirculating the collected washing fluid at a volume rate in the range of 50-600 gpm.

BRIEF DESCRIPTION OF THE DRAWINGS

FIG. 4 is a schematic view showing a still further improvement to the system of FIG. 1, including the use of heat.

BEST MODE FOR CARRYING OUT THE INVENTION

Figure 1:
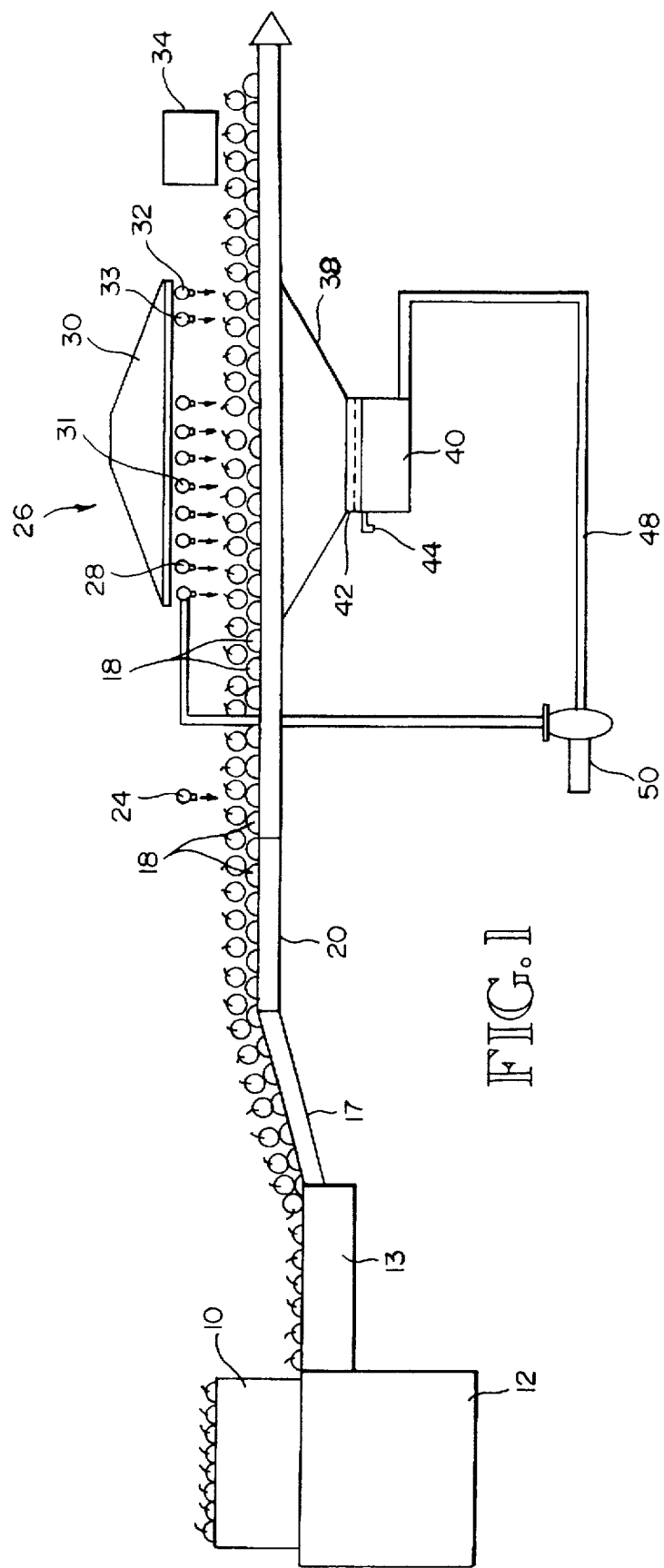
FIG. 1 is a schematic view of one embodiment of the system of the present invention.

Referring to FIG. 1, a typical packing line for apples is shown, including one embodiment of the apple cleaning system of the present invention. Apples 9—9 are brought to the packing line in large bins 10, which have been filled in the field. The apples are lowered into a water-filled container 12, referred to as a dumper, where they float. The moving part of the line extends into one portion 13 of the dumper, where it picks up the fruit and begins to move the fruit along the line. An apple packing line can vary significantly in width, but typically will be somewhere between three and seven feet wide, as indicated above. The packing line inclines slightly upwardly for a short distance from the dumper 12. This section is referred to generally as an elevator and is shown at 17. It includes a series of moving bars which extend to a pre-sort table 20. At this point, human operators inspect the fruit and make an initial sorting, culling out apples which have rotten spots or some other deformity which makes them unacceptable for marketing.

The apples are then deposited onto a "brush bed" which comprises a series of closely positioned cylindrical brushes and sponges 18—18 which extend across the packing line and are mounted for rotation on lateral rods or similar elements. The rods are rotated by a gear and motor combination (not shown). The apples are then soaped by a soaping head 24. The rotating brushes on which the apples ride scrub the soapy fruit as it continues to move down the line.

Up to this point, the cleaning treatment of the fruit has been conventional. Now the fruit enters a high pressure washing station, shown generally at 26. Washing station 26 includes several lines or banks of high pressure wash nozzles 28—28, which extend laterally across the packing line. In the embodiment shown, there are 8 lines of wash nozzles. In a typical six-foot wide bed, there will be 10-15 nozzles across the bed, with each nozzle being approximately 4-8 inches above the fruit to be sprayed. It should be understood, however, that a greater or lesser number of nozzles can be used. The nozzles 28—28 are arranged so as to direct the spray in a generally "fan" shape such that the spray wash does not impede the forward movement of the apples along the line or the tumbling action thereof. The fan-shaped spray pattern and the arrangement of the nozzles relative to the fruit results in the apples being sprayed over their complete surface, including both the stem and calyx ends, as they tumble through the pressure washing station 26.

A containment hood 30 is mounted so that it fits over the washing station 26, with the peripheral edge 31 of the hood extending approximately to or somewhat below the plane of the nozzles 28—28, as well as outboard thereof. This prevents overspray by the nozzles, as well as containing the resulting mist to the region of the packing line.

Beyond the high pressure washing station 26, the apples are moved through a chemical spray 33 and then a rinse 32, which typically are under hood 30 as well. There will usually be a small distance between the last row of high pressure washing nozzles and the chemical spray nozzles 33.

The apples are then continually dried by one or more fans 34. Then they are waxed, dried, again sorted, and then packed. These last stations are not shown in detail, since they are well known and part of a typical apple packing line.

Referring still to FIG. 1, the washing fluid from the high pressure nozzles, which is typically water, passes through the packing line brushes or bars and is collected (along with everything washed off the apples) by a catch pan 38, which is positioned beneath the high pressure washing station 26. The sides of the catch pan 38 slope inwardly and downwardly so that the washing fluid runs into a collection box 40. On top of collection box 40 is a flat, self-cleaning screen 42, which catches leaves and other large particulate which would plug nozzles 28 of the high pressure washing station if they were not removed prior to recirculation of the liquid. An automated brush or squeegee (not shown) can be used to periodically clean the screen. Extending from collection box 40, near the top thereof, is an overflow line 44 which continually bleeds off extra water from the collection box added by the low pressure chemical and fresh rinse nozzles 33 and 32, respectively.

A return line 48 and a high pressure pump 50 return the fluid to nozzles 28 in a continuous recirculation system. The pump 50 produces a pressure in the range of 70–300 psi, with a preferred pressure of approximately 120 psi. The volume of water recirculated is in the range of 50–600 gallons per minute (gpm), with a preferred volume of approximately 330 gpm for a six foot wide line.

The system of FIG. 1 has been shown to produce very satisfactory cleaning results. Unsightly deposits such as aphid residue and mineral deposits are removed not only from the surface of the apple, but from the stem and calyx ends of the fruit, as well. In addition, rotten areas or spots on the fruit are typically cleaned/eliminated by the high pressure washing action, and without decayed matter being deposited on other fruit in the line. These rotten areas/spots are thus exposed so that visual culling by hand of those apples is more efficient and easier. Further, and perhaps most importantly, these advantages are achieved without in any way damaging or harming the fruit, contrary to the historical expectations of apple packers.

Figure 2:
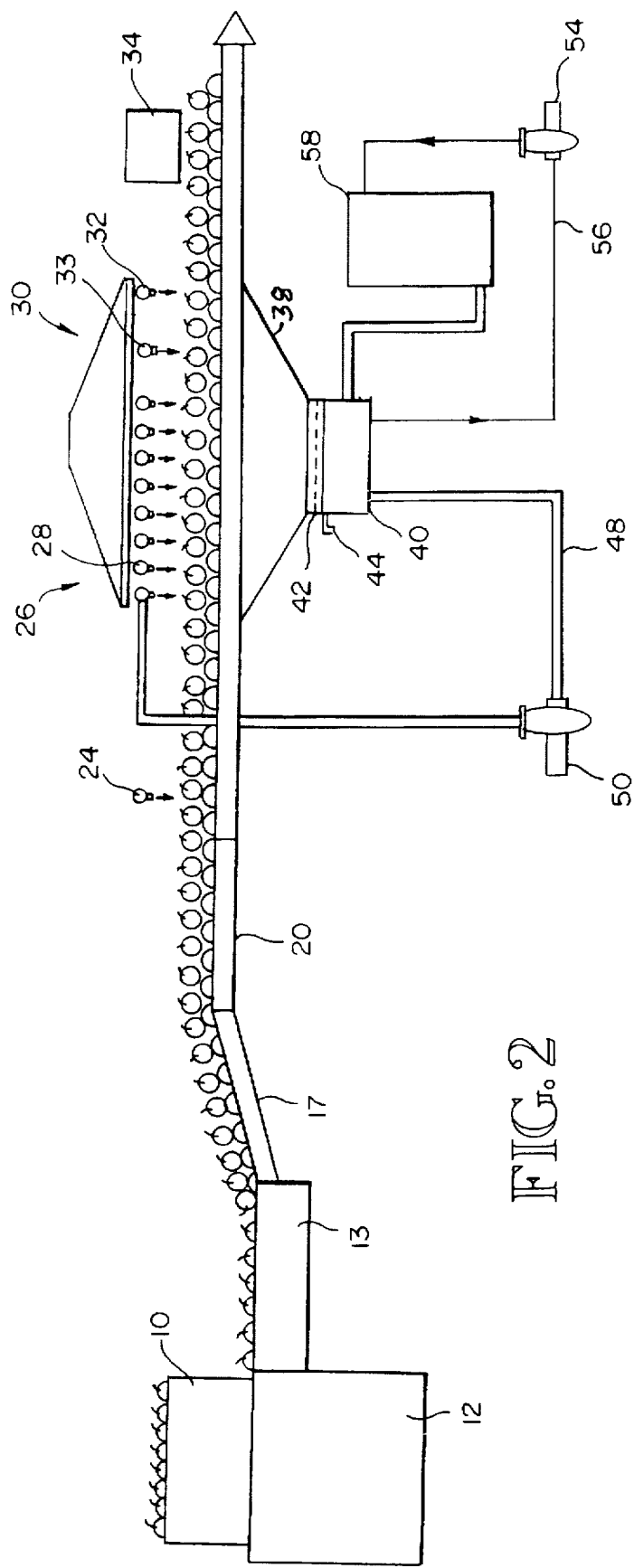
FIG. 2 is a schematic view showing an improvement to the system of FIG. 1.

FIG. 2 shows a modification of the embodiment of FIG. 1. In FIG. 2, a low pressure pump 54 is used to recirculate the fluid in the collection box 40 itself. Pump 54 draws water from collection box 40 through a line 56 and then pumps it through a heater 58 and then back to collection box 40. Heater 58 has sufficient capacity to maintain the temperature of the spray liquid from the nozzles 28 within a range of 80°–135° F., which is approximately the range between ambient temperature and just below the level which would damage the fruit (typically about 135° F.).

The temperature of the spray as maintained by the heater 58 would typically not be sufficient to kill most mold spores washed off the apples. However, the use of heated water results in cleaner and more appealing fruit. In addition, there is some evidence that the storage life of the apples is extended because the surface of the apples can now be heated quickly by the hot rinse just prior to waxing, instead of by long contact times in a hot dumper, which can damage the apples.

Figure 3:
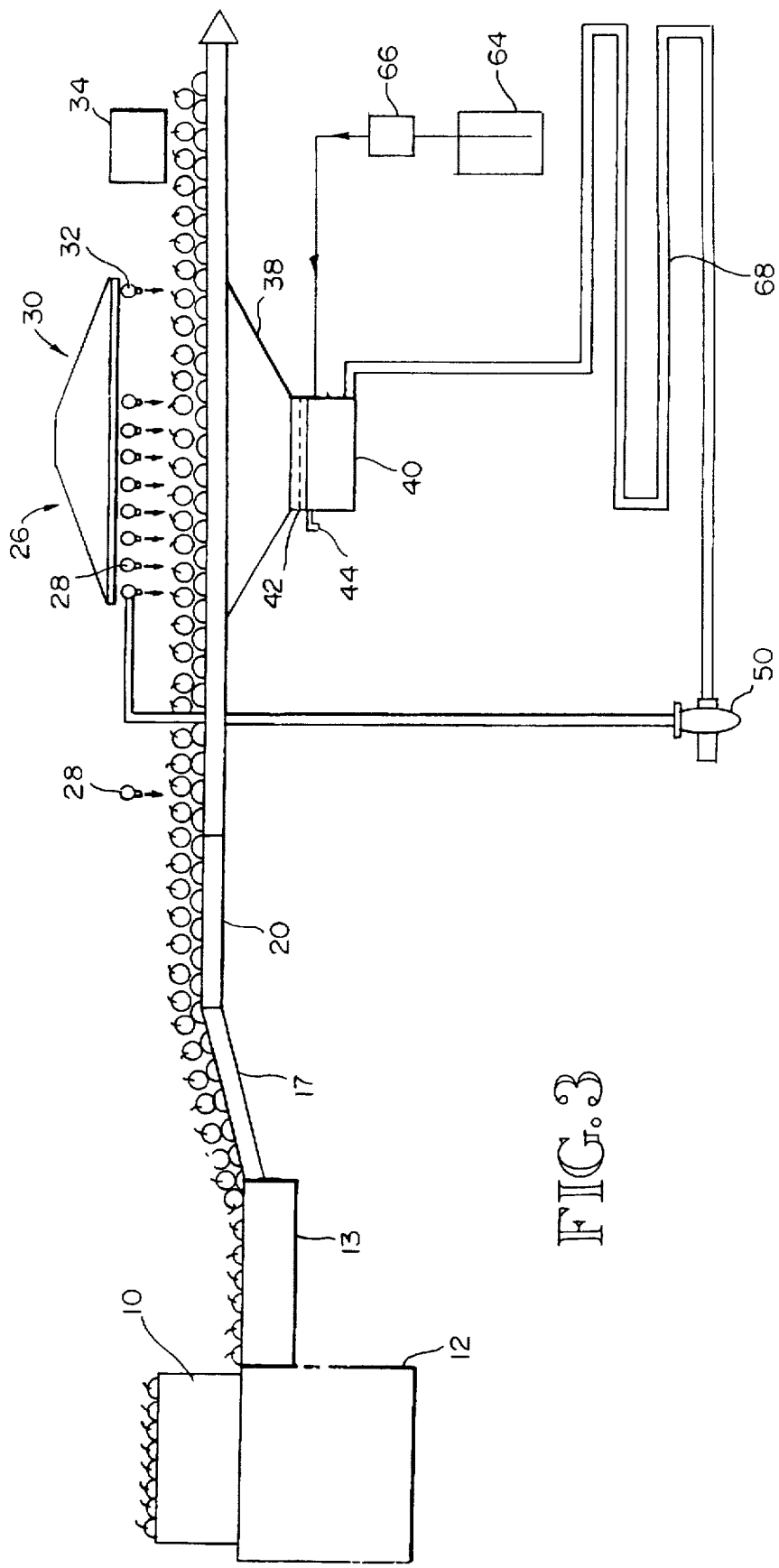
Figure 3 is a schematic view showing a further improvement to the system of FIG. 1, including the use of chemicals.

FIG. 3 shows a further modification of the embodiment of FIG. 1. In this embodiment, disinfecting the washing fluid by chemical means is included. While a heater such as shown in FIG. 2 is not shown specifically in FIG. 3, it should be understood that the washing fluid in this embodiment could be heated as well. A container 64 is used to hold chemicals, such as sodium hypochlorite, which will kill mold spores which are pathogenic to apples. A chemical pump 66 or equivalent device moves the chemical from container 64 to collection box 40, maintaining the concentration in the fluid in the collection box high enough to kill most spores (with sodium hypochlorite, for example, this value will be a total chlorine concentration of 70–150 ppm). The high pressure pump 50 will draw fluid from collection box 40 through a contact loop 68. Contact loop 68 is generally comprised of pipe which is long enough and large enough, such as 6 inches in diameter, 120 feet long, to ensure that the chemical added to the washing fluid has time to kill all or most of the spores in the fluid before they are recirculated to nozzles 28. Typically, this will be 30 seconds of exposure at a total chlorine concentration of 100 ppm.

FIG. 4 shows another modification of FIG. 1, with heat pasteurization to kill mold spores. A low pressure pump 72 draws washing fluid, i.e. water, from collection box 40 and pumps it to a heat exchanger 74, where the temperature of the fluid from box 40 is increased by about 20° F. (to approximately 135° F.) and then directed into a contact loop 76. A low pressure pump 78 draws fluid from an intake point at the beginning of contact loop 76 and pumps it through heater 82 to a point 1–2 feet downstream of the intake point. This heating of the fluid in the contact loop is intended to maintain the temperature of the fluid in the loop within a range of 135°–180° F. (typically 140° F.–145° F) which is sufficient to kill mold spores during the contact time that the fluid is in the loop, which is typically 20–60 seconds, preferably 30 seconds at a fluid temperature of 140° F. In this embodiment, there is typically no chemical spray following high pressure washing of the apples.

The fluid from contact loop 76 is then moved by high pressure pump 84 through heat exchanger 74. The fluid moved by pump 84, which is usually at a temperature of approximately 140° F., will have some of its heat transferred to the cooler fluid (typically about 115° F.) from collection box 40. The temperature of the fluid moved by pump 84 at the outlet of the heat exchanger 74 (prior to nozzles 28) will typically be in the range of 90°–130° F., typically 120° F. This fluid is delivered to the high pressure nozzles 28 for spraying of the apples.

Thus, an apple washing system for use in an apple packing line has been shown and described. It includes a plurality of high pressure wash nozzles which direct a spray toward all surfaces of the apple as it moves on the packing line. The pressure is in a particular range which surprisingly does not damage the fruit in any way but produces a better appearing apple ready for packing. The embodiment of FIG. 1 may be modified in a number of ways, including heating of the washing fluid, as well as chemical disinfection or heat pasteurization to kill mold spores and other organisms. Thus, the appearance of apples can be significantly enhanced without any corresponding damage to their exterior portions.

Certain other modifications may be made to the system. For instance, a portion of the dumper 12 can be utilized as the collection box instead of there being a separate element such as shown and described above. Further, the cleaning system of the present invention can be used in a pre-sizing/sorting line where the end results are sorted apples which are then put back into bins. For convenience, such a pre-sizing/sorting line is considered to be included under the term "packing line" in the claims.

Although a preferred embodiment of the invention has been disclosed herein for illustration, it should be understood that various changes, modifications and substitutions may be incorporated in such embodiment without departing from the spirit of the invention, which is defined by the claims as follows:

What is claimed is:

1. A system for cleaning apples prior to packing thereof, in a packing line system which includes a receiving end where apples move onto the packing line and a packing station, the cleaning system comprising:

means, including a high pressure pump means and spray nozzle means, for spray washing the apples with a washing fluid, while the apples are on the packing line, in the range of 70–300 psi, wherein the spray nozzle means are located above the apples on the packing line, wherein the pressure and volume of the fluid directed by the spray nozzle means onto the apples results in the entire surface of the apple being cleaned, including the stem and caylx ends thereof;

means for collecting the washing fluid after it has been used to wash the apples; and means for recirculating the washing fluid from the collecting means to the spray washing means at a volume rate in the range of 550–600 gpm.

2. A system of claim 1, including means for rinsing the apples prior to the packing thereof.

3. A system of claim 1, including means for conditioning the washing fluid in a selected manner following collection thereof.

4. A system of claim 3, wherein the conditioning means includes means for heating the washing fluid by circulating water from the collecting means through a heater, wherein the temperature of the heated washing fluid is above ambient temperature but below that where damage to fruit occurs or that necessary to kill mold spores.

5. A system of claim 3, wherein the conditioning means includes means for supplying a chemical for killing mold spores to the collecting means and an extended contact piping section extending from the collecting means, the contact piping section being of sufficient diameter and length that mold spores present in the washing fluid at an entry point of the contact piping section have been killed by said chemical by the time of exit of the fluid from the contact piping section.

6. A system of claim 3, wherein the conditioning means includes an extended contact piping section, means for moving washing fluid from the collection means to the contact piping section and means for heating the washing fluid in the contact piping section to a sufficient temperature, given the length and diameter of the contact piping section, to kill mold spores in the washing fluid present in the contact piping section.

7. A system of claim 6, including a heat exchange means for treating washing fluid which moves from the collecting means to the contact piping section in one direction and from the contact piping section to the spray washing means in the other direction.

8. A system of claim 7, wherein the temperature of the washing fluid in the contact piping section is high enough to kill organisms pathogenic to apples and the temperature of the washing fluid sprayed on the apples is low enough not to damage the apples.

9. A system of claim 1, wherein the washing fluid is water.

10. A system of claim 1, wherein the collecting means includes a catch member, a filter screen and a fluid collection container, the filter screen being positioned immediately before the collection container.

11. A system of claim 10, including an overflow line extending from the collection container near a top end thereof.

12. A system of claim 1, wherein said spray nozzles are located approximately at least four inches above the packing line, and wherein there are at least four rows of spray nozzles over said selected portion of the packing line.

13. A system of claim 12, including a containment hood mounted over the spray nozzles so as to confine the spray therefrom substantially to the packing line.

* * * * *

UNITED STATES PATENT AND TRADEMARK OFFICE
CERTIFICATE OF CORRECTION

PATENT NO. : 5,775,348
DATED : July 7, 1998
INVENTOR(S) : Heath Rush et al

It is certified that error appears in the above-identified patent and that said Letters Patent is hereby corrected as shown below:

Claim 1, line 18, the numeral "550" should be --50--.

Signed and Sealed this

Twenty-fifth Day of January, 2000

Attest:

Attesting Officer

*Acting Commissioner of Patents and Trademarks*